(12) United States Patent
Jacobs

(10) Patent No.: US 6,986,918 B2
(45) Date of Patent: Jan. 17, 2006

(54) SYSTEM AND METHOD FOR FACILITATING CUSTOMER APPRECIATION

(75) Inventor: Thomas E. Jacobs, Menomonee Falls, WI (US)

(73) Assignee: DCI Marketing, Inc., Milwaukee, WI (US)

( * ) Notice: Subject to any disclaimer, the term of this patent is extended or adjusted under 35 U.S.C. 154(b) by 0 days.

(21) Appl. No.: 10/034,045

(22) Filed: Dec. 27, 2001

(65) Prior Publication Data

US 2003/0082318 A1 May 1, 2003

Related U.S. Application Data

(60) Provisional application No. 60/335,695, filed on Oct. 25, 2001.

(51) Int. Cl.
*A47G 1/12* (2006.01)

(52) U.S. Cl. .............................. 428/14; 428/31; 428/67; 428/187; 428/542.2; 428/542.4; 40/1.5; 40/587; 40/591

(58) Field of Classification Search ................. 428/174, 428/13, 14, 31, 67, 187, 542.2, 542.4; 40/591, 40/587, 618, 1.5, 1.6; 280/927
See application file for complete search history.

(56) References Cited

U.S. PATENT DOCUMENTS

| 4,556,588 A | * 12/1985 | Rockwood .................... 428/13 |
| 5,547,306 A | 8/1996 | Zakrajsek |
| 5,581,852 A | 12/1996 | Zakrajsek |
| 6,434,873 B1 | * 8/2002 | Pierce ........................... 40/781 |
| 6,517,168 B1 | * 2/2003 | Van Hoten ............... 301/37.42 |

* cited by examiner

*Primary Examiner*—Deborah Jones
*Assistant Examiner*—Abraham Bahta
(74) *Attorney, Agent, or Firm*—Foley & Lardner LLP

(57) ABSTRACT

The present invention relates to an article for association with a motor vehicle. The article may include a base, and a plurality of inserts received in the base. Each insert has at least two characteristics. The at least two characteristics of each insert causes the plurality of inserts to form a substantially unique article profile.

48 Claims, 5 Drawing Sheets

SYSTEM AND METHOD FOR FACILITATING CUSTOMER APPRECIATION

RELATED APPLICATIONS

This application claims the benefit of U.S. Provisional Application No. 60/335,695, filed Oct. 25, 2001, titled "SYSTEM AND METHOD FOR FACILITATING CUSTOMER APPRECIATION" under 35 U.S.C. §119(e).

FIELD OF THE INVENTION

The present invention relates generally to a system and method for facilitating customer appreciation, for example, through the use of a device such as a medallion presented to customers.

BACKGROUND OF THE INVENTION

It is known to provide a device such as a medallion for display on a motor vehicle, such as a car or truck, etc. Such medallions may be affixed to a grille or other mounting structures of the motor vehicle (e.g. fenders, hoods, trunks, etc.). Such medallions are intended to provide a consistent and standard look for identifying the manufacturer of the motor vehicle, the brand of the motor vehicle, the model of the motor vehicle, etc. Typically, all medallions used within a "series" for a particular manufacturer, brand or model, etc., have the same look, configuration, and/or visual effect.

Many owners select motor vehicles for reasons based on personal preference, such as an affinity for a particular manufacturer and/or model. Some owners derive and/or wish to express visibly a sense of pride of ownership of a particular brand or model of motor vehicle. Known medallions may generally express this pride or affinity for such owners. However, such known medallions do not allow for the indication of any unique or any sort of personal expression of this type of owner pride or loyalty. If a customer wants to express pride of ownership, it is typically left to the use of a typical or common medallion (that looks exactly like every other medallion for that model/manufacturer). That is, such known medallions are not configured to be "customized" to facilitate appreciation of individual customers, some of whom may have purchased five, ten or twenty or more vehicles of the same model or from the same manufacturer during their lifetimes.

Accordingly, it would be advantageous to provide a system and method for facilitating customer appreciation, for example, through the use of a device such as a medallion capable of association with a particular owner, which would allow the expression by the owner of loyalty or the pride of ownership of a customer article such as a motor vehicle. It would also be advantageous to provide a system configured to allow serialization of each individual device or medallion. It would further be advantageous to provide a system including distribution or a device or medallion which is unique to an individual owner. It would further be advantageous to provide a system including a device or medallion which can be tracked and identified by its own uniqueness. It would further be advantageous to provide a system using a device or medallion which offers a relatively consistent appearance identified as being associated with a particular manufacturer (or model year), but also facilitates customer appreciation on an individualized or personalized basis through the issuance of a device or medallion having a unique identifier or profile for the customer. It would be further advantageous to provide a medallion composed of a set of elements capable of arrangement in a variety of unique patterns to form a variety of unique appearances for the device within a common theme.

It would be desirable to provide a system and method which provides one or more of these or other advantageous features.

SUMMARY OF THE INVENTION

The present invention relates to an article for facilitating consumer appreciation. The article can be associated with a motor vehicle. The article includes a base and a plurality of inserts received in the base, each insert having at least two characteristics. The at least two characteristics of each insert causes the plurality of inserts to form a substantially unique article profile.

The present invention also relates to a set of articles for association with motor vehicles. The set of articles comprises a set of bases, each base associated with each article, and sets of inserts, each set of inserts having a plurality of individual inserts. Each insert has at least two characteristics. A set of inserts is associated with each base and is received in the base. The at least two characteristics of the plurality of inserts forms an article profile and each article profile is substantially unique.

The present invention further relates to an article prepared by a process of generating an article profile, associating the article profile with selected information, and generating assembly instruction from the article profile.

The present invention further relates to a process of manufacturing an article for association with a customer profile. The process includes generating an article profile, associating the article profile with selected information, and generating assembly instructions from the article profile.

The present invention further relates to a method of recognizing customer loyalty. The method includes receiving a customer profile, generating a substantially unique article profile, and associating the unique article profile with the customer profile.

DETAILED DESCRIPTION OF EXEMPLARY EMBODIMENTS

A system and method for facilitating customer appreciation is shown in the FIGURES.

Figure 1:
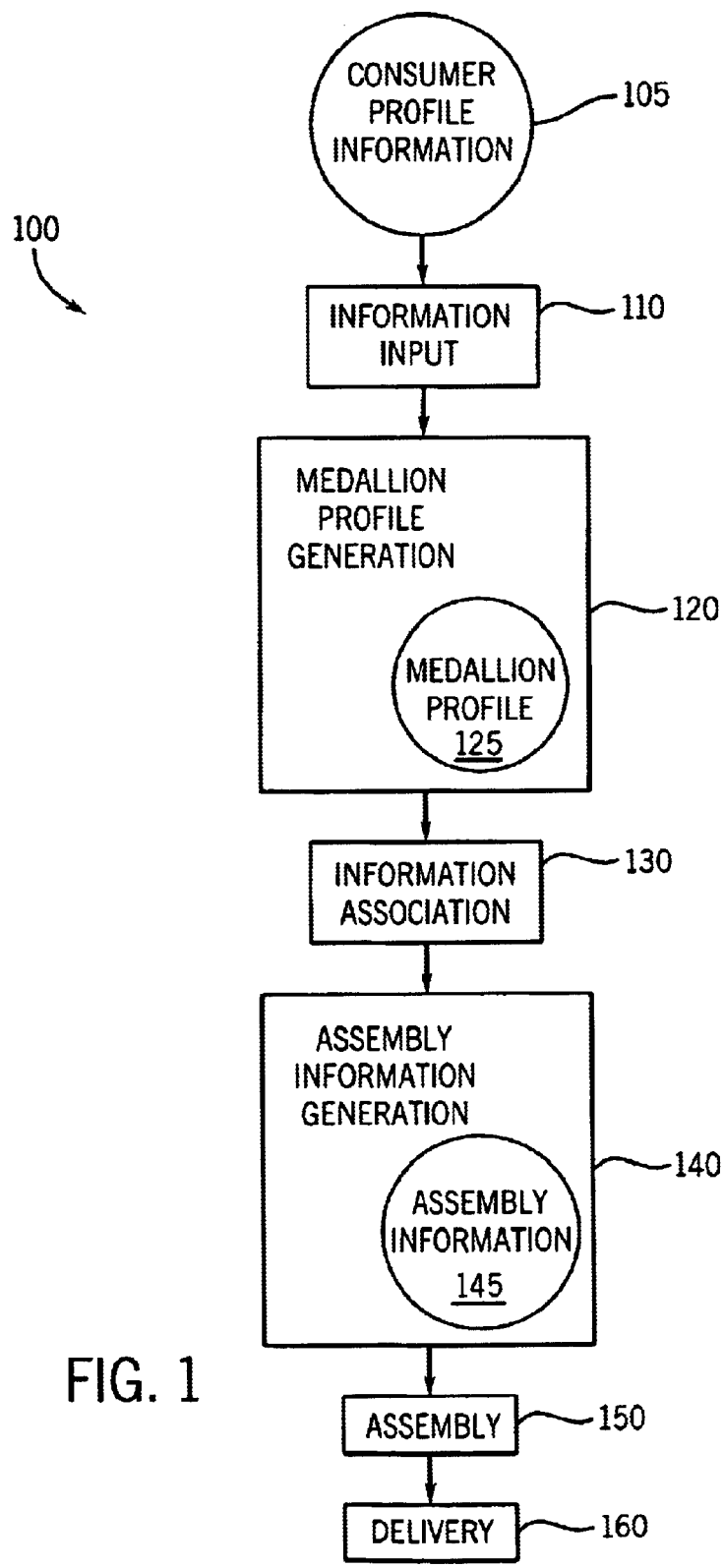
FIG. 1 is a flowchart illustrating a system and method for facilitating customer appreciation according to a preferred embodiment.
Figure 2:
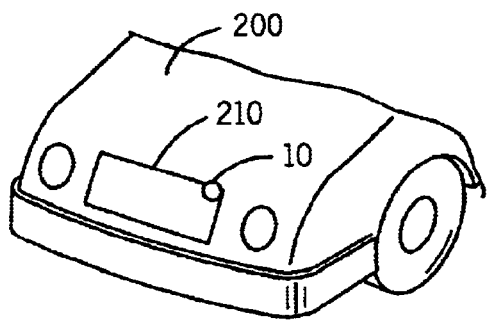
FIG. 2 is a fragmentary perspective view of a vehicle and a device.
Figure 3:
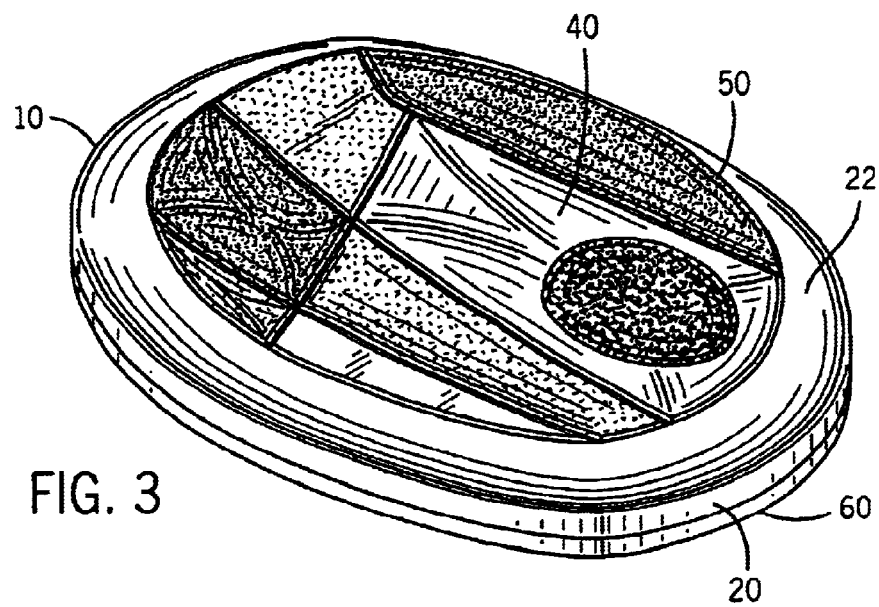
FIG. 3 is a perspective view of a device according to an exemplary embodiment.

FIG. 1 is a schematic representation of a system and method shown as including a process 100 for gathering and organizing information in conjunction with the generation of a device or article shown as a medallion 10, (see FIG. 3). Process 100 includes the steps of gathering customer information (step 110), generating a customized medallion profile 125 associated with the customer information (step 120), archiving the combined information (Step 130), directing the manufacture of medallion 10 using customized medallion profile 125 (step 150), and delivering medallion 10 to a customer (step 160). According to a preferred embodiment, process 100 may be used by an automobile dealer or manufacturer to show appreciation to a customer who has purchased an automobile by presenting a customer medallion 10 to the customer. However, it will be appreciated that the process may be employed in connection with a variety of transactions, for example, in the sale, rental, lease or other disposition of vehicles or other products, or other transactions where customer loyalty is sought to be recognized. According to an exemplary embodiment, process 100 is used in connection with the sale of a vehicle (shown as an automobile 200 in FIG. 2) to a customer.

As shown in FIG. 1, process 100 includes information input (step 110), medallion profile generation (step 120), information association (step 130), assembly information generation (step 140), assembly (step 150), and delivery (step 160).

Information input (step 110) imports or creates a customer information profile 105. Customer information profile 105 can include any information that is useful in tracking customer loyalty, such as sales information, purchaser name, purchaser address, number of vehicles purchased, vehicle identification number (VIN), date of purchase, model purchased, etc. According to an exemplary embodiment, information input (step 110) is implemented by vehicle dealers and/or vehicle manufacturers. According to an alternative embodiment, information input (step 110) is implemented directly by a customer, data entry personnel, etc. The step may be completed by completing a form or by an automated or computer-based process and/or over a network (such as the Internet).

Following information input (step 110), a medallion profile generation (step 120) is performed. According to a preferred embodiment, medallion profile generation (step 120) can incorporate information from consumer information profile 105.

In medallion profile generation (step 120), a medallion profile 125 is generated. Medallion profile 125 includes information relating to and characterizing a set of inserts 40, see FIG. 3. According to a preferred embodiment, medallion profile 125 includes the color and surface topography of each individual insert which will be used in the medallion. According to a preferred embodiment, medallion profile 125 may include information such as the number of cars owned or previously owned by a customer. (This information may be derived from consumer information profile 105.) According to a preferred embodiment, the number of cars owned may then be correlated to a medallion insert 40h as described below in reference to FIG. 4B. According to an alternative embodiment, this information may be omitted, or insert 40h may be replaced with a blank insert with no surface indicia.

According to a preferred embodiment, medallion profile 125 is generated by a computer system (or the like) to ensure that a unique medallion profile is generated, and that no other medallion will have the same medallion profile. One exemplary method of generating the profile may be implemented by assigning a number to each combination of design options that exist. According to an exemplary embodiment, a flat, black, rhodium insert would be design option one, while a concave, black, rhodium insert would be design option two. In accordance with this numbering scheme, a number could be assigned to each possible unique design configuration for each of the seven inserts. If ten design configurations were considered for each of the seven inserts in an exemplary embodiment, each device or medallion could be tracked by assignment of a seven digit number. The number can be a listing of the design configuration numbers for each device in a consistent order. This number could be stored and referenced against a listing of existing medallions to ensure that a unique profile is generated. If more design options were implemented, or more inserts were contemplated, the same system could be used to create a larger number. A medallion profile may alternatively be generated by moving down a sequential list of design configuration numbers generated using the system described above. Other methods such as random number generators, etc. may be used to provide a unique configuration and identification number for each unique device.

Medallion profile 125 is associated or related with information from customer profile 105 and archived for future reference (step 130). According to an exemplary embodiment of the present invention, medallion profile 125 may be recorded and associated with a customer name, VIN, model, etc. Medallion profile 125 may be associated with customer profile 105 using a database, a serial number list, or any other convenient method. This association and storage step has the advantage of facilitating replacement of medallions. If replacement is requested, the stored profile may be used for assembly of a replacement device.

The medallion profile can be used to generate assembly information or a pick list 145 (step 140). In the manufacture of medallion 10, the parts (i.e. base and inserts) are typically stored in separate bins, where like parts are stored in like bins. Assembly information or pick list 145 can be used to determine which parts are to be pulled from the bins (picked) and used in the assembly and construction of medallion 10.

Medallion 10 can be assembled in accordance with assembly information 145 (step 150). Medallion 10 may be assembled by hand, by an automated process, or by some combination of processes. If automation is used, assembly information is provided to the automation equipment.

Following assembly of medallion 10 (step 150), a step 160 can be performed, wherein medallion 10 is delivered in accordance with consumer information profile 105. For example, medallion 10 may be delivered to the customer, dealer, manufacturer, etc.

Medallion 10, assembled and delivered as described above, can be unique to each customer. According to an exemplary embodiment, medallion 10 can be designed to resemble the front portion of a vehicle. In alternative embodiments it can be a dealer emblem, abstract art, or any other desired image that could facilitate customer appreciation.

As shown in FIG. 3, medallion 10 includes a base unit 20, an outer edge 22 of base 20, a set of elements or inserts 40, individual inserts 40a–40h, and a backer 60. Set of elements 40 is composed of a variety of shapes and forms. Each element 40a through 40h, shown in FIG. 4B, can have unique materials, surface treatment, finish, color, contour, shape, profile, etc. Each element 40a through 40h can be formed to fit within a predetermined set of interfitting arrangements so that by making/selecting various possible arrangements of the elements within the set (from a picklist and/or related assembly information) a wide variety of individual devices, each having a unique and/or distinctive appearance, can be assembled and issued to individual customers.

In FIG. 3, a preferred embodiment of a device, shown as a medallion 10, is shown. Medallion 10 is only one of numerous unique embodiments of a device that can be assembled according to any preferred embodiment of the system and method. According to any preferred embodiment, a large number of individual medallions having unique shapes, contours, and colorations may be constructed from a relatively small number of variously shaped and colored components and inserts, independent of the exact configuration, construction, and arrangement. According to alternative embodiments, a variety of components, configurations, colors, and/or shapes of the various components may be used in the device.

According to an exemplary embodiment, base 20 is a unitary body formed from die-cast zinc/aluminum. According to an alternative embodiment, base 20 may be constructed from other materials such as metals, metal alloys, plastics, polymers, or any other material. Base 20 may also be provided with indicia (such as lettering and numbering) on outer edge 22 of base 20, which may relate to the manufacturer to which medallion 10 is to be associated.

Figure 4B:
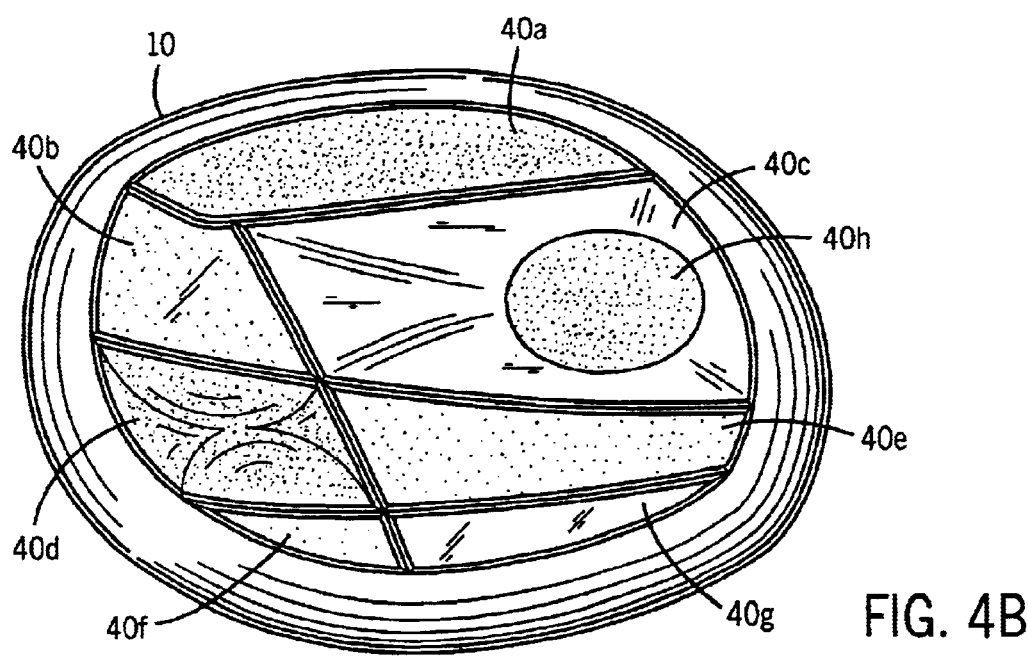
FIG. 4B is a top plain view of the device shown in FIG. 3.
Figure 4A:
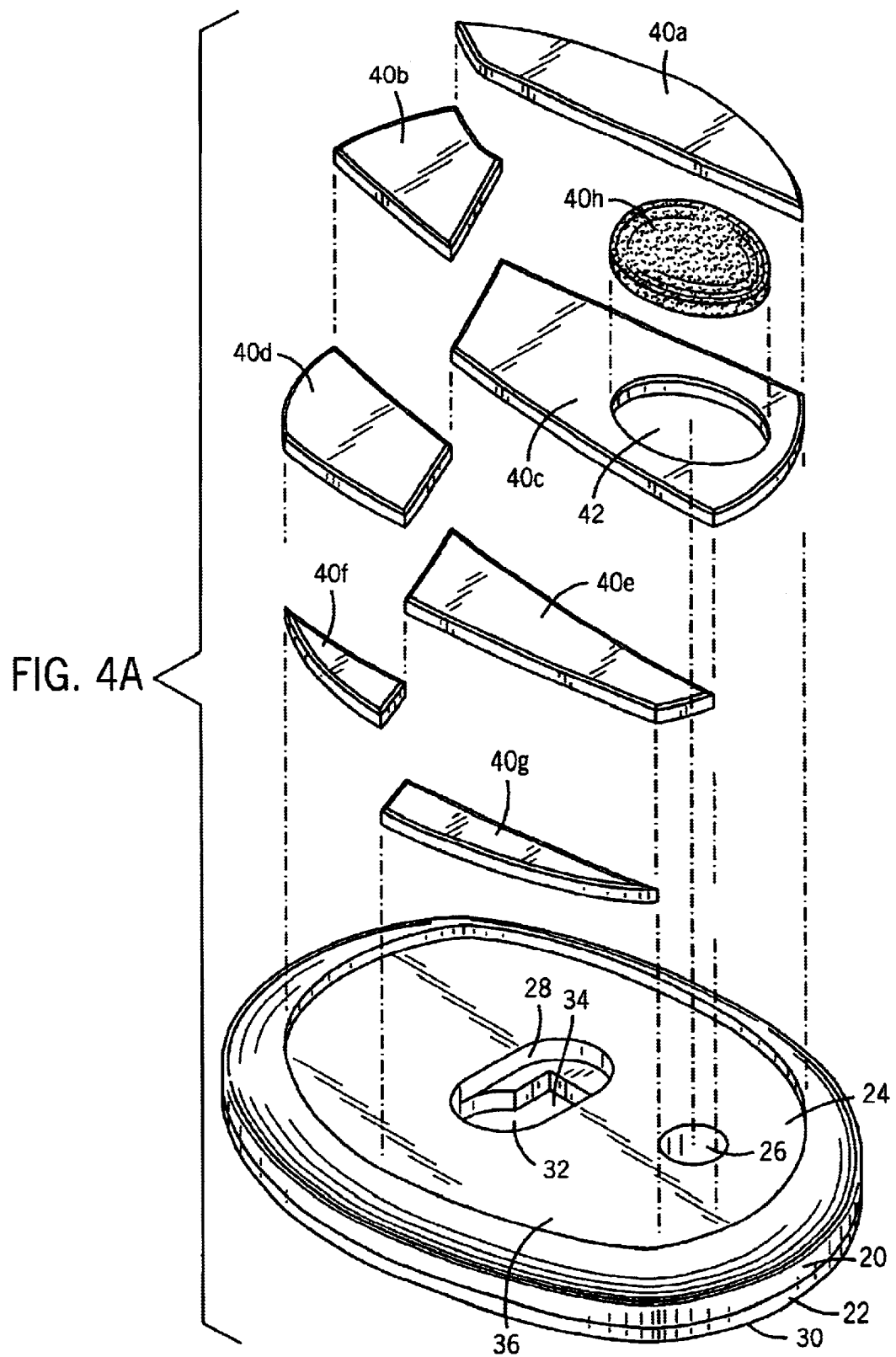
FIG. 4A is an exploded perspective view of a device according to an exemplary embodiment.
Figure 5A:
FIGS. 5A through 5C are front elevation views of inserts for the device shown in FIG. 3.
Figure 5B:
Figure 5C:
Figure 6A:
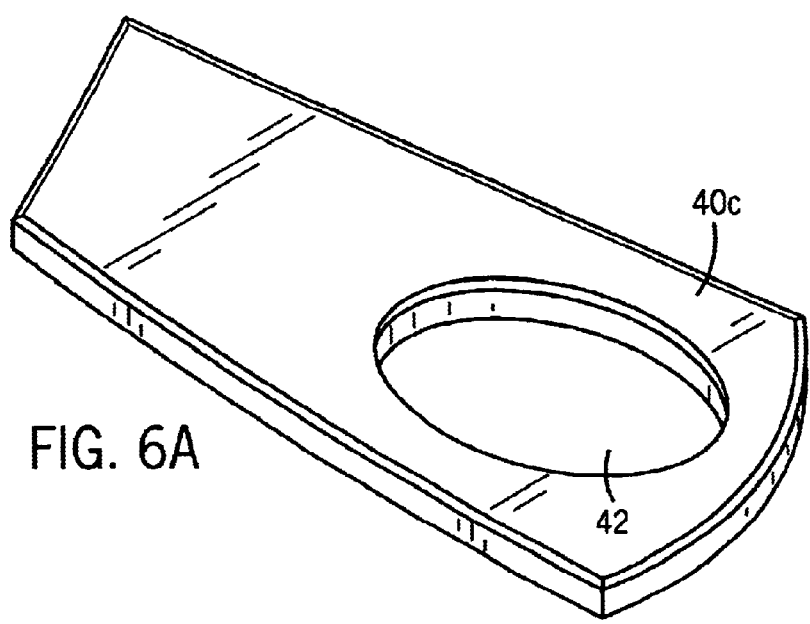
FIG. 6A is a perspective view of an insert shown in FIG. 4A.
Figure 6B:
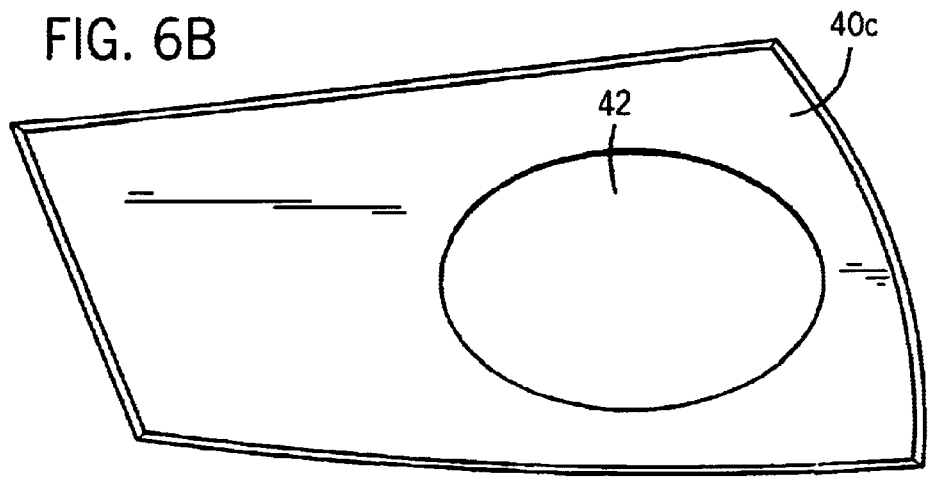
FIG. 6B is a top down view of the insert shown in FIG. 4A.

As shown in FIG. 4A, base 20 includes depression 24, aperture 26, and slot 28. According to an exemplary embodiment, depression 24 is a pan shaped depression, forming an area in which inserts 40 are received. Depression 24 has a depth roughly equivalent to the thickness of inserts 40.

Aperture 26 is provided through back surface 30 of base 20. As shown in FIG. 4A, aperture 26 is aligned with insert 40h. Aperture 26 facilitates the removal of insert 40h.

Slot 28 is provided through a back surface 30 of base 20. Slot 28 is configured to receive a fastening member (not shown) for attaching medallion 10 to a support structure 210 (see FIG. 2). According to an exemplary embodiment, support structure 210 is a vehicle grille. The fastening member may be any bracket, clip, connector, clamp, or other means configured to securely fasten medallion 10 to support structure 210. In the exemplary embodiment shown in FIG. 4A, slot 28 has a key-way configuration. Slot 28 includes a circular portion 32, and a rectangular portion 34 provided proximate to circular portion 32. Slot 28 is configured to receive the head of a fastener (such as a screw, bolt, or the like) in circular portion 32. The head of the fastener may then be slid into the rectangular portion 34 of slot 28. Once the head of the fastener is seated in rectangular portion 34, the fastener is tightened to securely fasten base 20 to support structure 210. According to an alternative embodiment, the medallion may be assembled without a slot, and be configured for use as a decorative article.

As shown in FIG. 4A, medallion 10 further includes inserts 40. In the exemplary embodiment shown, inserts 40 include eight separate insert pieces 40a, 40b, 40c, 40d, 40e, 40f, 40g, and 40h. According to a preferred embodiment, inserts 40a through 40g are made of injected cast zinc/aluminum. According to an alternative embodiment, the inserts may be made from any of a wide variety of other materials such as metals, metal alloys, plastics, polymers, or any other suitable material.

Inserts 40 are received in depression 24 of base 20. Inserts 40 cover a bottom surface 36 of depression 24. Inserts 40 may be combined, (e.g., much like pieces of a jig-saw puzzle) to create a patterned surface 50 as shown in FIG. 3. According to an exemplary embodiment, inserts 40 are attached to base 20 using an adhesive fastener applied between a lower surface of the inserts (not shown) and bottom surface 36. According to a preferred embodiment, the adhesive fastener is an epoxy glue. In alternative embodiments, the adhesive fastener may use any other fastening techniques including other epoxies, glues, tapes, mechanical fasteners, welding, etc. As illustrated in FIGS. 3 through 7C, inserts 40 can be provided in a variety of shapes, surface contours, colors, finishes, etc.

As shown in FIGS. 3, 4A and 4B, inserts 40 may be made from a variety of different materials and colors, and provided with a variety of different surface finishes. In preferred embodiments, colors of inserts 40 are selected from black (such as nickel-plated black onyx), white (such as white diamond enamel), and platinum (such as rhodium). According to an alternative preferred embodiment, colors of inserts 40 are selected from colors available from the model or manufacturer of the car with which medallion 10 will be associated. According to an alternative embodiment, colors of inserts may be any desired color, color scheme, etc. Inserts 40 may have a bright chrome finish, may be plated with Rhodium type chrome finishing (see FIG. 5A), may have an electro chrome coating (see FIG. 5B) or may have a hematite or black nickel finish plated with Chromium (see FIG. 5C). The inserts may be provided with a water resistant, chemical resistant, and/or corrosive resistant coating.

As shown in FIG. 4A, inserts 40 each have a different footprint or outline. According to a preferred embodiment, no one insert has the same footprint or outline as any other insert. According to a preferred embodiment, the footprint or outline of inserts 40 can be derived from an artistic impression of a front corner of the vehicle that the medallion is to be associated with. For example, as shown in FIG. 4B, insert 40a is derived from a vehicle hood, insert 40b is derived from an upper vehicle head-lamp, insert 40c is derived from a vehicle grille, insert 40d is derived from a lower vehicle head-lamp, insert 40e is derived from the vehicle part located below the vehicle grille, insert 40F is derived from a vehicle the vehicle part located below the headlamp, and insert 40g is derived from a vehicle bumper.

Figure 7A:
FIGS. 7A through 7C are cross-sectional views of inserts according to exemplary embodiments.
Figure 7B:
Figure 7C:
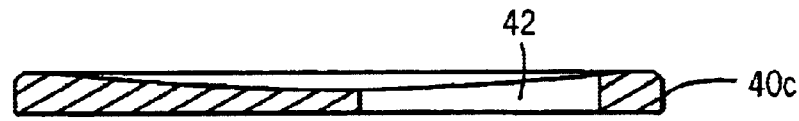

As shown in FIGS. 7A through 7C, each one of inserts 40a through 40h may be made with, and selected from different surface profiles or surface contours. For example, insert 40c is shown in a cutaway view in FIG. 7A with a flat profile, in FIG. 7B in a cutaway view with a convex profile, and in FIG. 7C in a cutaway view with a concave profile. According to alternative embodiments, the inserts may be constructed with other footprints, shapes, colors, profiles, or topologies to those contemplated herein.

Medallion 10 further includes insert 40h, shown in FIG. 4B. Insert 40h is received in an aperture 42 of insert 40c. According to an exemplary embodiment, insert 40h is made from injection molded ABS plastic, and is hi-glass black in color. According to an alternative embodiment, insert 40h may be made from other materials such as metals, metal alloys, plastics, polymers, etc. According to a preferred embodiment, indicia such as numbering and lettering is provided on a top surface 44 of insert 40h. In a particularly preferred embodiment, indicia may be representative of the number of cars previously purchased, owned, or leased by the medallion's owner. Insert 40h, in a particularly preferred embodiment, may be provided with surface indicia ranging from Arabic numerals 1 to 40, the word "Master," a mark, logo or symbol associated with the manufacturer of the vehicle for which the medallion will be associated, or no indicia may be provided on insert 40*h* (i.e. insert 40*h* may be left blank). Indicia on insert 40*h* may be representative of the number of vehicles purchased (i.e. 1–40), or a status or level of ownership (i.e. "Master," in a particularly preferred embodiment, is given to owners who have purchased more than forty cars from a manufacturer). According to an alternative embodiment, indicia on insert 40*h* can be a car manufacturer's logo for when the medallion is used as a paperweight or in other unmounted configurations. In another alternative embodiment, the indicia may be some design not meant to represent the number of vehicles purchased.

As described above, insert 40*h* can be provided on top of aperture 26. This configuration allows for the easy removal of insert 40*h* from medallion 10 by inserting an implement through aperture 26 and popping insert 40*h* out of aperture 42. It may be desirous to remove insert 40*h* in order to update the number of vehicles purchased, when ownership status changes, etc. Insert 40*h* may further include a cover or bubble of clear epoxy material over the top of top surface 44 to protect the indicia.

As shown in FIG. 3, medallion 10 further includes backer 60. Backer 60 has a general footprint shape similar to base 20. According to an exemplary embodiment, backer 60 is a rubber or other elastomeric material. In a particularly preferred embodiment, backer 60 is a 60 Durometer rubber material, 1/32 inch thick applied to back surface 30 of base 20 with a double faced tape. Other arrangements for attaching backer 60 to base 20 may be used, such as adhesives, tapes, etc. Backer 60 also has apertures (not shown) corresponding to slot 26 and aperture 28 in base 20.

By combining or preparing inserts 40*a* through 40*g* with different coloration, finishes, and surface profiles, a large number of unique medallion configurations patterns and/or profiles may be generated. For example, in one exemplary embodiment, each insert may be selected from three color and surface finish choices. Each insert may also be selected from three different surface profiles. As a result of these choices, each insert 40*a* through 40*g* of medallion 10 may be selected from nine different color and topography combinations. Seven inserts (40*a* through 40*g*) are used for medallion 10, with each individual insert having nine possible configurations. According to a particularly preferred embodiment, as a result of using seven separate inserts, each with nine different configurations, almost five million medallions may be generated without any two medallions having the exact same configuration, pattern or profile. If more unique medallions were required, just one extra design option would allow for the creation of more than 5 million additional unique profiles. A new design option could include a new insert finish, a new insert color, a new insert texture, a new insert surface profile, etc.

The large number of medallion profiles may be generated from a relatively small number of different parts (63 different configurations of inserts 40*a* through 40*g*) in the exemplary embodiment shown in the FIGURES allows for the manufacture of a large number of unique medallions with relatively few parts. Because such a large number of medallions may be made, with each medallion having a unique medallion profile (e.g. surface pattern and/or coloration), it is possible to have the profile of each medallion operate as a serial number or a unique identifier for an individual medallion. In effect, the medallion profile may operate as a built-in certificate of authenticity for each medallion. The unique medallion profile allows for a correlation or association between the medallion and selected information.

It is important to note that the construction and arrangement of the elements of the medallion shown in the preferred and other exemplary embodiments are illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the scope of the present inventions as expressed in the appended claims.

What is claimed is:

1. A medallion for association with a motor vehicle comprising:

a base; and inserts installed within the base having different ornamental appearances selected from, a first set of inserts having at least two visible characteristics defining a first ornamental appearance;

a second set of inserts having at least two visible characteristics defining a second ornamental appearance; and a third set of inserts having at least two visible characteristics defining a third ornamental appearance;

wherein the visible characteristics defining the ornamental appearance of each of the inserts comprise at least one of variations in color, shape, surface profile, outline, material and indicia;

wherein the at least two visible characteristics of the first set of inserts are different than the at least two visible characteristics of the second set of inserts so that the first ornamental appearance is different than the second ornamental appearance;

wherein the at least two visible characteristics of the first set of inserts are different than the at least two visible characteristics of the third set of inserts so that the first ornamental appearance is different than the third ornamental appearance;

wherein the at least two visible characteristics of the second set of inserts are different than the at least two visible characteristics of the third set of inserts so that the second ornamental appearance is different than the third ornamental appearance;

so that a plurality of unique ornamental appearances for the medallion is defined by the different ornamental appearances of the inserts that can be selected, arranged and installed within the base of the medallion to form the medallion;

wherein the visible characteristics are associated with objective features of a customer profile: and wherein the medallion is formed with one of the plurality of unique ornamental appearances by selection and installation within a first depression of the base of at least one of the first set of inserts, at least one of the second set of inserts, and at least one of the third set of inserts.

2. The medallion of claim 1 wherein the depression comprises a bottom surface.

3. The medallion of claim 1 wherein the objective features of the customer profile comprise at least one of sales information, purchaser name, purchaser address, number of vehicles purchased, a date of purchase, a vehicle identification number, and a model purchased.

4. The medallion of claim 1 wherein each insert has a different outline from other inserts.

5. The medallion of claim 4 wherein the outline is correlated to a portion of the motor vehicle.

6. The medallion of claim 2 wherein the inserts substantially fill the depression and a plurality of the inserts interface with one another.

7. The medallion of claim 1 wherein the surface profile is at least one of flat, concave, and convex.

8. The medallion of claim 1 wherein at least one insert is provided with indicia.

9. The medallion of claim 8 wherein the indicia is associated with a number of motor vehicles purchased.

10. The medallion of claim 1 wherein the base is configured to be attached to a support structure.

11. The medallion of claim 10 wherein the base is configured to receive a fastening member.

12. The medallion of claim 10 wherein the support structure is a vehicle grille.

13. The medallion of claim 1 wherein the inserts are coupled to the base by way of adhesive.

14. The medallion of claim 1 wherein a fixed number of unique configurations of the medallion may be created.

15. A set of articles for association with motor vehicles comprising:
a set of bases for association with articles; and
sets of inserts comprising a first set of inserts having at least two visible characteristics defining a first ornamental appearance, a second set of inserts having at least two visible characteristics defining a second ornamental appearance, and a third set of inserts having at least two visible characteristics defining a third ornamental appearance, each set of inserts having a plurality of individual inserts;
wherein the visible characteristics defining the ornamental appearance of each of the inserts comprise at least one of variations in color, shape, surface profile, surface finish, outline, material, and indicia;
wherein unique configurations of the articles may be created by selecting and arranging inserts with different combinations of visible characteristics within a base to form an article;
wherein the visible characteristics are associated with objective features of a customer profile; and
wherein the article is formed with one of a plurality of unique ornamental appearances by selection and installation within a first depression of one of the bases at least one of the first set of inserts, at least one of the second set of inserts, and at least one of the third set of inserts.

16. The set of articles of claim 15 wherein the depression comprises a bottom surface.

17. The set of articles of claim 15 wherein each insert has a different outline from other inserts.

18. The set of articles of claim 15 wherein the objective features of the customer profile comprise at least one of sales information, purchaser name, purchaser address, number of vehicles purchased, a date of purchase, a vehicle identification number, and a model purchased.

19. The set of articles of claim 16 wherein the inserts substantially fill the depression and a plurality of the inserts interface with one another.

20. The set of articles of claim 15 wherein the surface profile is at least one of flat, concave, and convex.

21. The set of articles of claim 15 wherein at least one insert of a set of inserts is provided with indicia.

22. The set of articles of claim 21 wherein the indicia is associated with a number of motor vehicles purchased.

23. The set of articles of claim 15 wherein each base is configured to be attached to a support structure.

24. The set of articles of claim 23 wherein the support structure is a vehicle grille.

25. The set of articles of claim 23 wherein the base further includes a slot.

26. The set of articles of claim 15 wherein the articles are medallions and wherein a fixed number of configurations of the medallions may be created.

27. The set of articles of claim 15 wherein the inserts are coupled to the base by way of adhesive.

28. An article prepared by a process comprising:
generating an article configuration by installing inserts having different ornamental appearances within a base and the inserts selected from,
a first set of inserts having at least two visible characteristics defining a first ornamental appearance;
a second set of inserts having at least two visible characteristics defining a second ornamental appearance; and
a third set of inserts having at least two visible characteristics defining a third ornamental appearance
associating the article configuration with selected information;
generating assembly instructions from the article configuration;
wherein the at least two visible characteristics of the first set of inserts are different than the at least two visible characteristics of the second set of inserts so that the first ornamental appearance is different than the second ornamental appearance;
wherein the at least two visible characteristics of the first set of inserts are different than the at least two visible characteristics of the third set of inserts so that the first ornamental appearance is different than the third ornamental appearance;
wherein the at least two visible characteristics of the second set of inserts are different than the at least two visible characteristics of the third set of inserts so that the second ornamental appearance is different than the third ornamental appearance;
wherein the visible characteristics are associated with objective features of a customer profile;
so that a plurality of unique ornamental appearances for the article is defined by the different ornamental appearances of the inserts that can be selected, arranged and installed within the base of the article to form the article; and
wherein the article is formed with one of the plurality of unique ornamental appearances by selection and installation within a first depression of the base of at least one of the first set of inserts, at least one of the second set of inserts, and at least one of the third set of inserts.

29. The article prepared by the process of claim 28 wherein the article configuration comprises surface profile characteristics for a set of elements, wherein the set of elements are associated with the article.

30. The article prepared by the process of claim 29 wherein the surface profile characteristics include at least one of flat, concave, and convex.

31. The article prepared by the process of claim 28 wherein the article configuration comprises color characteristics for a set of elements, wherein the set of elements are associated with the article.

32. The article prepared by the process of claim 31 wherein the article configuration includes surface profile characteristics for the set of elements.

33. The article prepared by the process of claim 32 wherein the surface profile characteristics include flat, concave, and convex.

34. The article prepared by the process of claim 28 wherein the article configuration comprises material characteristics for a set of elements, wherein the set of elements are associated with the article.

35. In a system for forming a medallion comprised of a base and inserts installed within the base, the improvement comprising:

wherein the inserts comprise ornamental appearances selected from,
- a first set of inserts having at least two visible characteristics defining a first ornamental appearance;
- a second set of inserts having at least two visible characteristics defining a second ornamental appearance; and
- a third set of inserts having at least two visible characteristics defining a third ornamental appearance;

wherein the visible characteristics defining the ornamental appearance of each of the inserts comprise at least one of variations in color, shape, surface profile, surface profile, outline, material and indicia;

wherein the at least two visible characteristics of the first set of inserts are different than the at least two visible characteristics of the second set of inserts so that the first ornamental appearance is different than the second ornamental appearance;

wherein the at least two visible characteristics of the first set of inserts are different than the at least two visible characteristics of the third set of inserts so that the first ornamental appearance is different than the third ornamental appearance;

wherein the at least two visible characteristics of the second set of inserts are different than the at least two visible characteristics of the third set of inserts so that the second ornamental appearance is different than the third ornamental appearance;

so that a plurality of unique ornamental appearances for the medallion is defined by the different ornamental appearances of the inserts that can be selected, arranged and installed within the base of the medallion to form the medallion;

wherein the visible characteristics are associated with objective features of a customer profile; and wherein the medallion is formed with one of the plurality of unique ornamental appearances by selection and installation within a first depression of the base of at least one of the first set of inserts, at least one of the second set of inserts, and at least one of the third set of inserts.

36. The medallion of claim 35 wherein the depression comprises a bottom surface.

37. The medallion of claim 36 wherein the inserts substantially fill the depression and a plurality of the inserts interface with one another.

38. The medallion of claim 37 wherein the inserts are coupled to the bottom surface of the base by way of adhesive.

39. The medallion of claim 35 wherein the color is associated with available colors from a manufacturer of the motor vehicle.

40. The medallion of claim 35 wherein each insert has a different outline from other inserts and the outline is correlated to a portion of the motor vehicle.

41. The medallion of claim 35 wherein the surface profile is at least one of flat, concave, and convex.

42. The medallion of claim 35 wherein at least one insert is provided with indicia.

43. The medallion of claim 42 wherein the indicia is associated with a number of motor vehicles purchased.

44. The medallion of claim 35 wherein the base is configured to be attached to a support structure.

45. The medallion of claim 44 wherein the base is configured to receive a fastening member.

46. The medallion of claim 44 wherein the support structure is a vehicle grille.

47. The medallion of claim 35 wherein the objective features of the customer profile comprise at least one of sales information, purchaser name, purchaser address, number of vehicles purchased, a date of purchase, a vehicle identification number, and a model purchased.

48. The article prepared by the process of claim 28 wherein the objective features of the customer profile comprise at least one of sales information, purchaser name, purchaser address, number of vehicles purchased, a date of purchase, a vehicle identification number, and a model purchased.

* * * * *